United States Patent
Yeh

(10) Patent No.: US 6,375,888 B1
(45) Date of Patent: Apr. 23, 2002

(54) METHOD OF INTEGRALLY FORMING A BICYCLE FRONT FORK FORMED FROM A COMPOUND MATERIAL

(76) Inventor: Chien-Hwa Yeh, 54, Chiu-Chu Rd., Ta-Shu Hsiang, Kaohsiung Hsien (TW)

( * ) Notice: Subject to any disclaimer, the term of this patent is extended or adjusted under 35 U.S.C. 154(b) by 0 days.

(21) Appl. No.: 09/350,305

(22) Filed: Jul. 9, 1999

(30) Foreign Application Priority Data

Aug. 5, 1998 (TW) .......................................... 87112895

(51) Int. Cl.$^7$ .............................................. B29C 33/46
(52) U.S. Cl. ....................... 264/516; 264/129; 264/138; 264/162; 264/257; 264/258; 264/314; 264/DIG. 50
(58) Field of Search ................................ 264/516, 255, 264/258, 313, 314, 207, 162, 129, 138, DIG. 50

(56) References Cited

U.S. PATENT DOCUMENTS

| | | | | |
|---|---|---|---|---|
| 3,892,831 A | * | 7/1975 | Robin et al. ................ | 264/103 |
| 4,264,389 A | * | 4/1981 | Staub et al. ................ | 156/156 |
| 4,828,285 A | * | 5/1989 | Foret et al. ................ | 280/279 |
| 5,016,895 A | * | 5/1991 | Hollingsworth et al. .... | 280/280 |
| 5,039,470 A | * | 8/1991 | Bezin et al. ................ | 264/255 |
| 5,176,868 A | * | 1/1993 | Davis ........................ | 264/257 |
| 5,540,877 A | * | 7/1996 | Repetto et al. ............. | 264/513 |
| 5,766,539 A | * | 6/1998 | Fujita et al. ................ | 264/512 |
| 5,853,651 A | * | 12/1998 | Lindsay et al. ............. | 264/512 |
| 5,944,932 A | * | 8/1999 | Klein et al. ................ | 156/245 |

* cited by examiner

*Primary Examiner*—Jan H. Silbaugh
*Assistant Examiner*—Stefan Staicovici
(74) *Attorney, Agent, or Firm*—Rosenberg, Klein & Lee

(57) ABSTRACT

A method of integrally forming a bicycle front fork formed from a compound material including the steps of preparing a mold of a length greater than the front fork; forming a curved groove at a rear end of the mold; winding a blank of a front fork shape from a compound material and placing the blank into the mold; inserting an inflatable tube into the blank from a vertical tube at an upper end thereof through a forced portion on one side and round the curved groove and then through a formed portion on the other side to have the end in the vertical tube; and forming a front fork from the blank by inflation, heating and applying pressure.

2 Claims, 7 Drawing Sheets

METHOD OF INTEGRALLY FORMING A BICYCLE FRONT FORK FORMED FROM A COMPOUND MATERIAL

BACKGROUND OF THE INVENTION (a) Field of the Invention

The present invention relates to a method of integrally forming a bicycle front fork formed from a compound material.

(b) Description of the Prior Art

In the past, bicycles were mainly made of iron material and were therefore heavy. To improve the rigidity of the front fork and reduce the overall weight of the bicycle, manufacturers later utilized aluminum material to make bicycles. With the development of compound materials, which have advantages over aluminum, manufacturers begin to contemplate upon the replacement of aluminum material with compound materials in making bicycles. However, there is a problem in forming the front fork completely with compound materials since the front fork includes two fork portions extending from a lower end of an upright tube. Although molds can be developed to have grooves corresponding to the shape of the front fork, and the compound materials can be wound to form a corresponding blank, an inflatable tube cannot be directly sleeved into the front fork blank to proceed with the formation processes that include inflation, heating and pressure applying. Therefore, manufacturers have devised the method of forming the upright tube 1 from aluminum material first, and then forming the two fork portions 2a, 2b using compound materials such that the fork portions 2a, 2b are adhered firmly to corresponding flanges 11 at a lower end of the upright tube 1. A woven fabric 3 of compound material is wound around each of the joints between the flange 11 and the fork portion 2a or 2b, as shown in FIGS. 1 and 2. The assembly is then placed into molds 4 for inflation, heating, and pressing (only the lower mold is shown). After formation, it is only necessary to process the joints. The above method of forming the front fork can in a way reduce the overall weight of the bicycle and enhance the joining strength; however, since the lower fork 2a, 2b are required to couple with the flanges 11 of the upright tube 1, there may be stress concentration and connection deviation at the joints, which are drawbacks to be overcome.

SUMMARY OF THE INVENTION

The present invention relates to a method of integrally forming a bicycle front fork formed from a compound material.

A primary object of the present invention is to provide a method of integrally forming a bicycle front fork formed from a compound material, in which the front fork is integrally formed from a compound material to enhance work efficiency and attain preferred structural strength.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
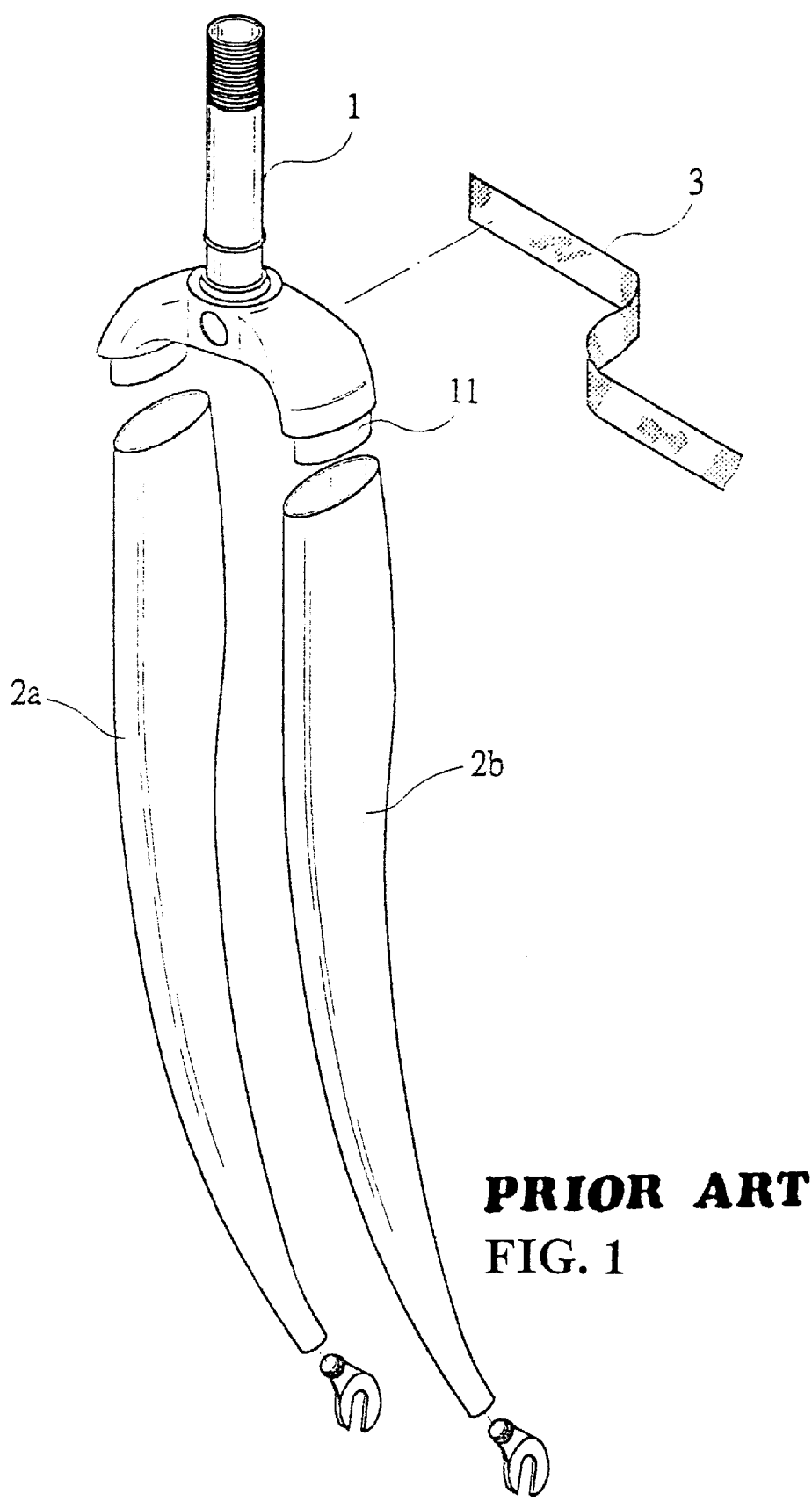
FIG. 1 is an exploded view of a conventional front fork.
Figure 2:
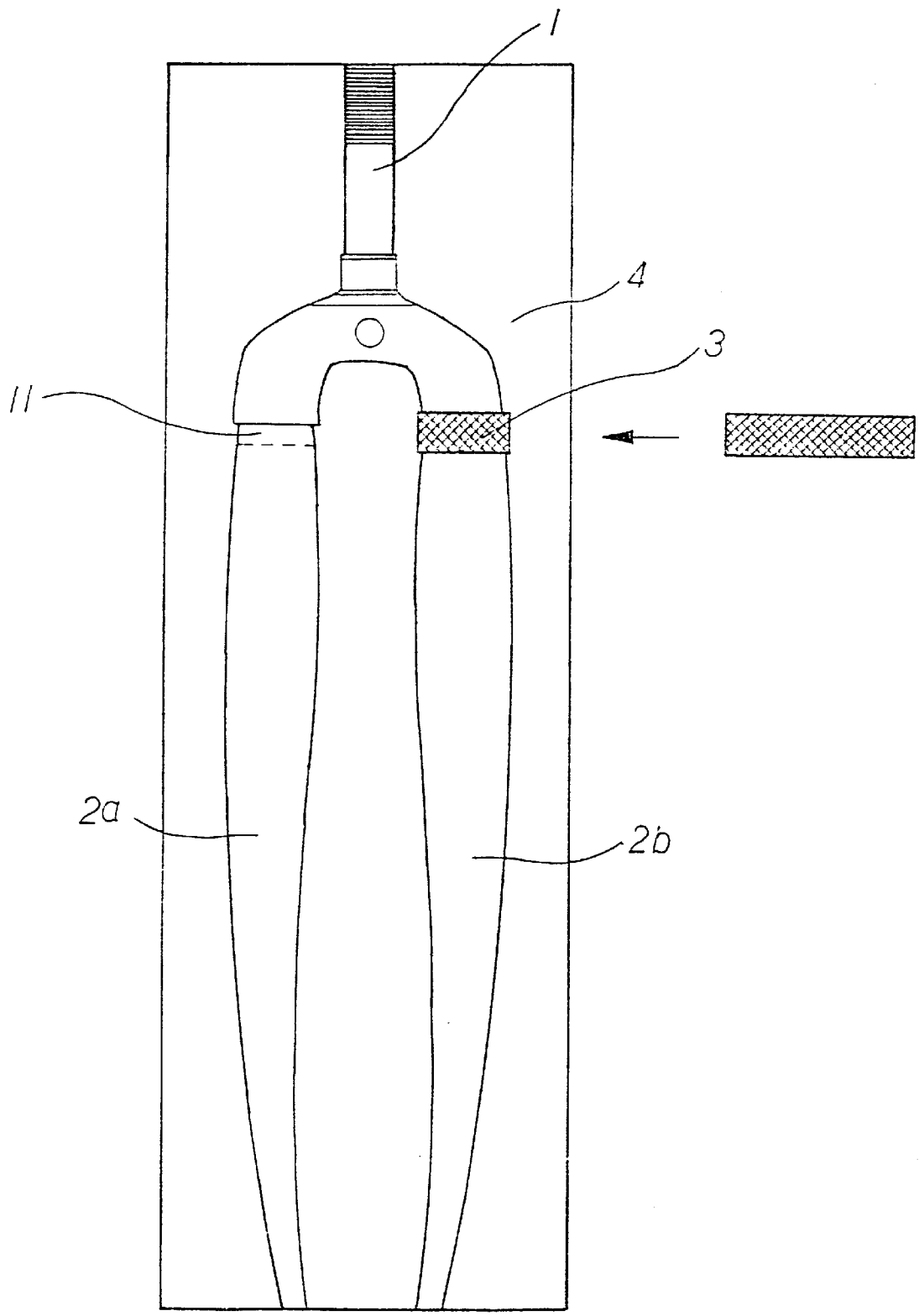
FIG. 2 is a schematic view illustrating formation of the conventional front fork.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
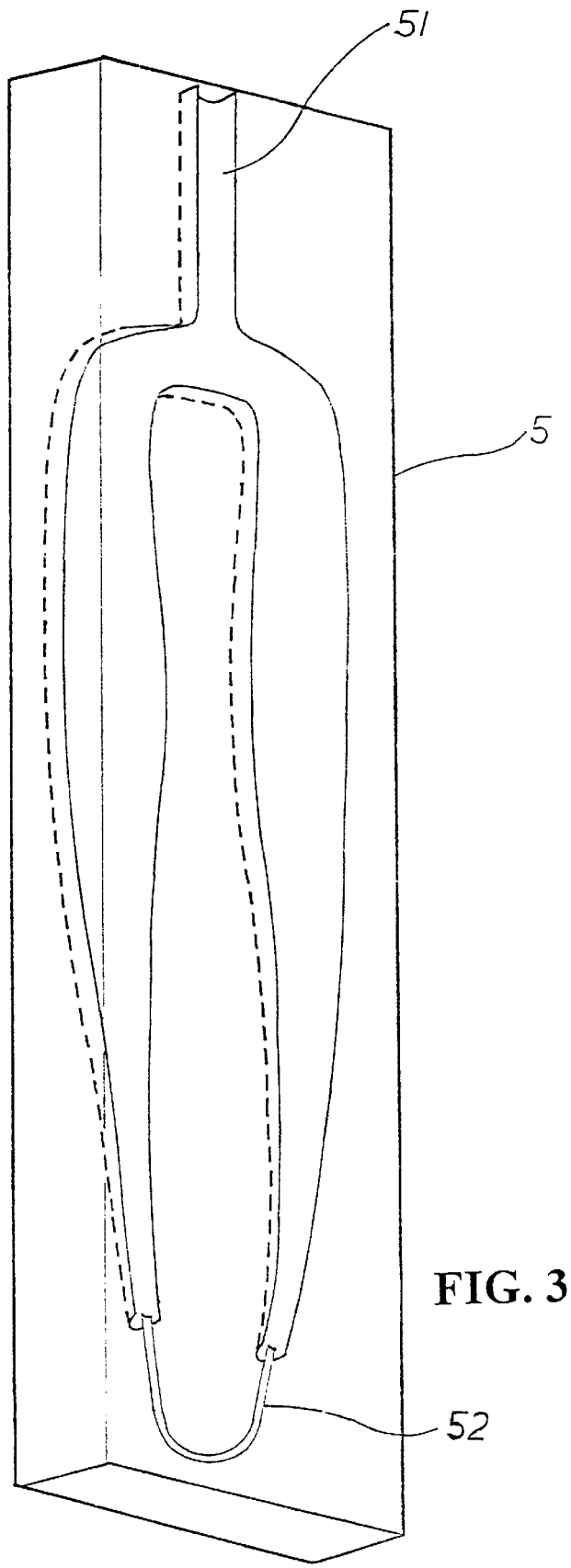
FIG. 3 is a schematic view of a preferred embodiment of a mold according to the present invention.
Figure 4:
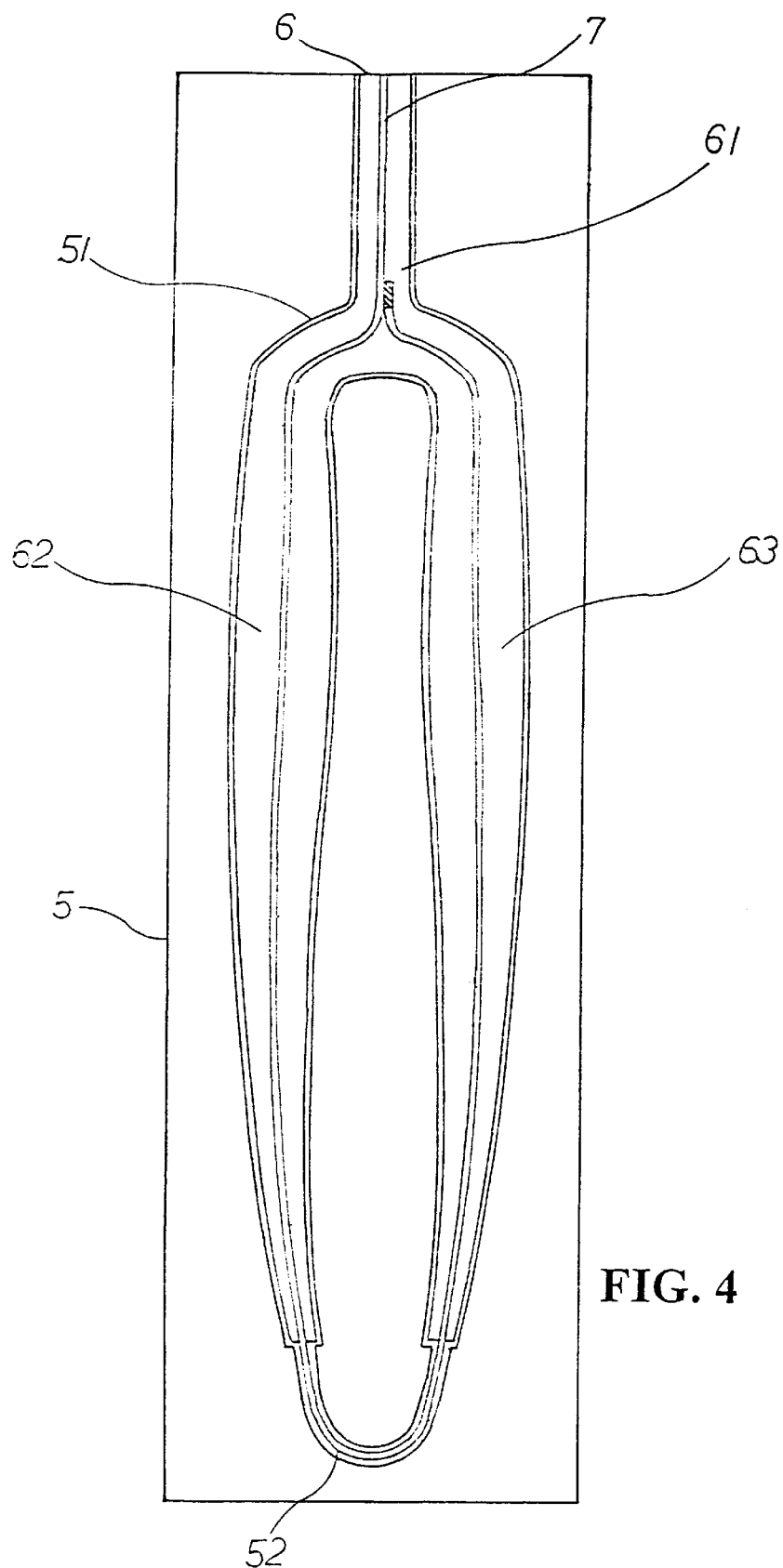
FIG. 4 is a schematic view of a preferred embodiment of formation.
Figure 5:
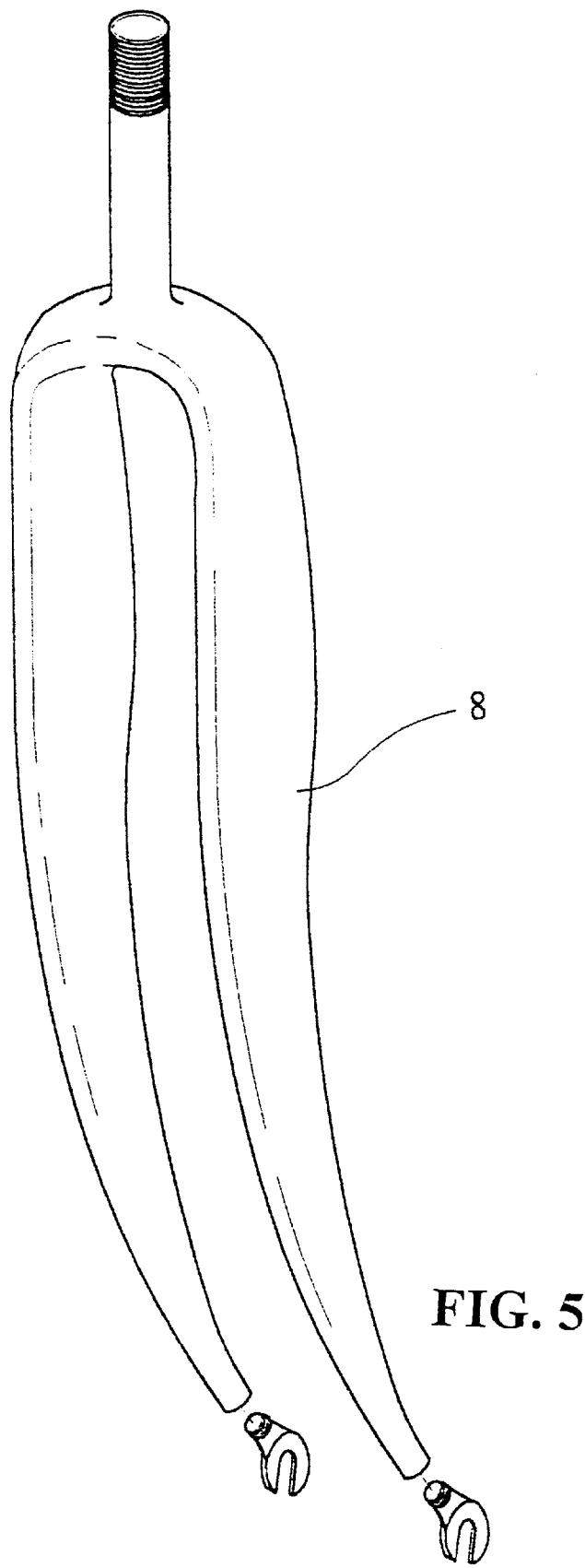
FIG. 5 is a perspective view of a front fork product according to the present invention.

With reference to FIG. 3, the method according to the present invention is described using the lower mold as an example. As shown, a mold 5 adopted in the method of the present invention has a length longer than that of the front fork and is formed with a groove 51 of a shape and size identical to those of the front fork. A curved groove 52 is further provided at a rear end of the mold. The curved groove 52 has two ends connected integrally to rear ends of the forked portions of the groove 51. With reference to FIG. 4, a blank 6 corresponding to the shape of the front fork is wound using a compound material in combination with a core mold (not shown). Subsequently, an inflatable tube is inserted into the blank 6 from a vertical tube 61 at an upper end through a forked tube 62 on one side and then round the curved groove 62 into the other forked tube 63 and the end is then tied firmly in position in the vertical tube 61. The inflatable tube 7 can thus go round the entire blank 6. After inflation, heating, and pressure application, an integral front fork blank can be accomplished. Next, the front fork blank thus formed is processed by grinding, painting, etc., to achieve a front fork product 8 as shown in FIG. 5.

It will be understood that each of the elements described above, or two or more together may also find a useful application in other types of methods differing from the type described above. While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

In the present invention, since the rear end of the mold 5 is formed with a curved groove 52 to be connected to the groove 51 to achieve a continuous path, the inflatable tube 7 can go through the entire blank 6 to achieve integral formation of a front fork product 8 from a compound material. The front fork product 8 thus formed has preferred structural strength and does not have any joints, hence no concentration of stress.

Figure 6:
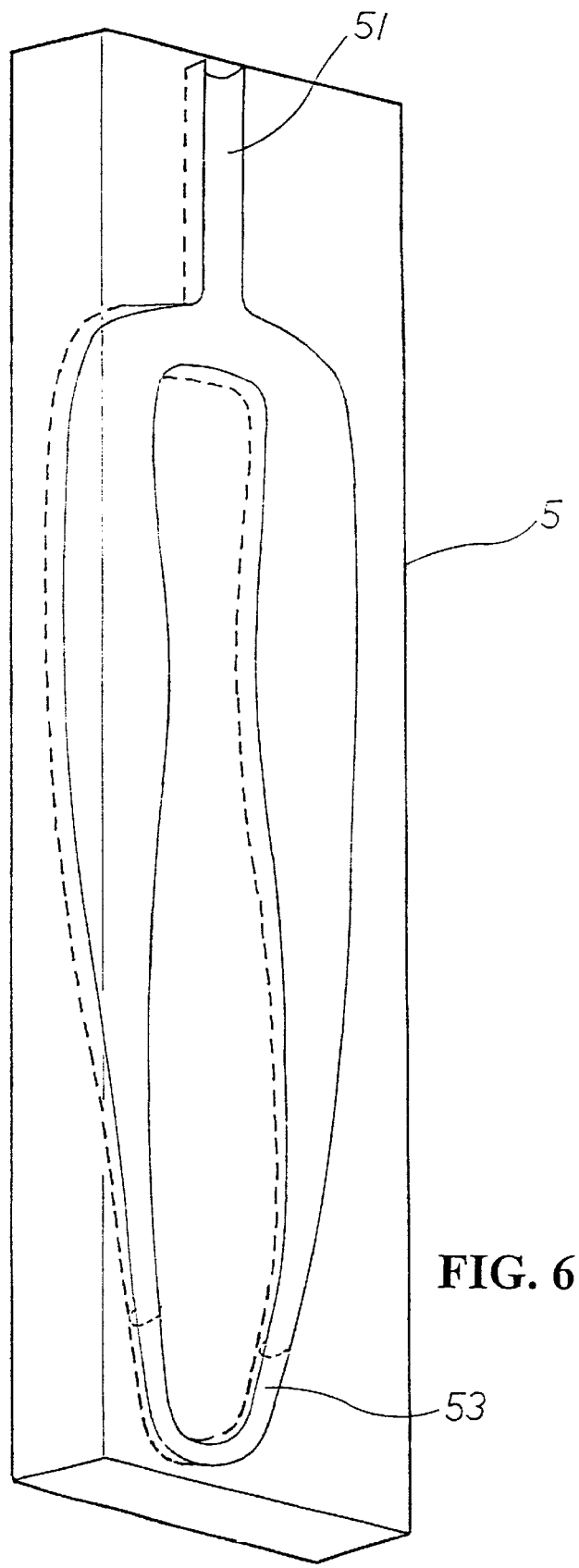
FIG. 6 is another preferred embodiment of a mold according to the present invention.
Figure 7:
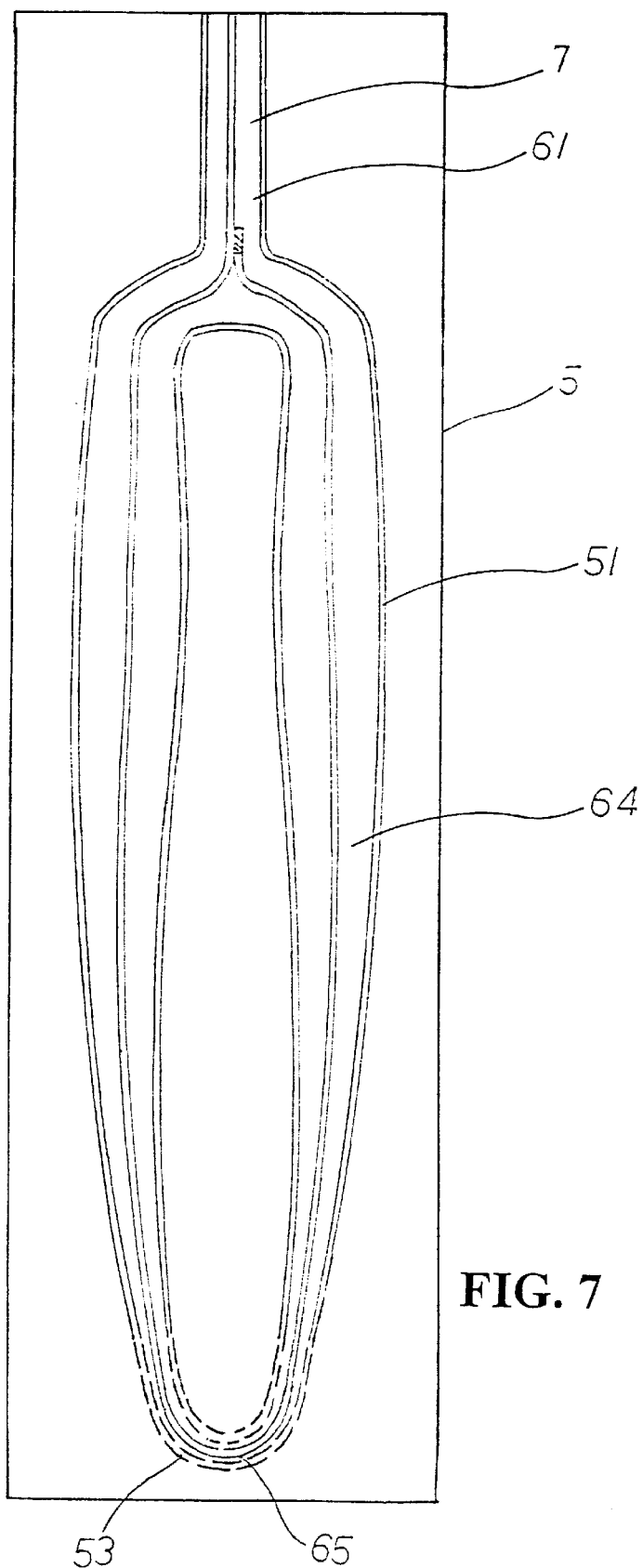
FIG. 7 is a schematic view of another preferred embodiment of formation.

With reference to FIG. 6, which shows another preferred embodiment, the two rear ends of the forked portions of the groove 51 are connected by a channel 53 of a similar width. The phantom lines show where they are connected. Referring to FIG. 7, a blank 6 wound from a compound material includes a vertical tube 61 and an annular tube 64 at a lower end. A lower end of the annular tube 64 at the channel 53 is a relatively thin section 65 (shown by phantom lines). Likewise, an inflatable tube 7 is inserted into the blank 6 from the vertical tube 61 round the annular tube 64 to have the end tied in the vertical tube 61. Then, the steps of inflating, heating and pressure applying are performed to obtain a front fork blank, from which the relatively thin section 65 is cut. The front fork blank then undergoes the processing steps of grinding, painting, etc., to accomplish a finished front fork product.

I claim:

1. A method of integrally forming a bicycle front fork formed from a compound material, comprising the steps of preparing a mold having a length greater than a length of a front fork to be formed therein; forming in the mold a groove having a size and shape matching that of the front fork to be formed in the mold; forming in the mold a curved groove at a rear end thereof, the curved groove having two ends connected integrally with rear ends of two forked portions of the groove; forming a blank of a compound material having the shape of the front fork; placing the blank in the groove of the mold; inserting an inflatable tube into the blank via a vertical tube at an upper end of the blank, through a forked portion on one side of the blank, through the curved groove, then through a forked portion on another side of the blank and back to the vertical tube, an end of the inflatable tube being tied in the vertical tube; performing inflation of the inflatable tube, and heating and applying pressure to the mold to form the blank into a front fork blank; processing the front fork blank by grinding and painting to obtain a front fork product.

2. A method of integrally forming a bicycle front fork formed from a compound material, comprising the steps of preparing a mold having a length longer than a length of a front fork to be formed therein; forming in the mold a groove having a size and shape matching that of the front fork to be formed in the mold; forming in the mold a channel of a width similar to that of the groove and in open communication therewith; forming a blank of a compound material, the blank including a vertical tube and an annular tube at a lower end of the vertical tube, the annular tube having a relatively thin section at a lower end corresponding to the channel; placing the blank in the groove and channel of the mold; inserting an inflatable tube into the blank via the vertical tube, through the annular tube and back to the vertical tube, an end of the inflatable tube being tied in the vertical tube; performing inflation of the inflatable tube, and heating and applying pressure to the mold; removing the blank from the mold and cutting off the relatively thin section to obtain a front fork blank; processing the front fork blank by grinding and painting to obtain a front fork product.

* * * * *